R. W. COFFEE.
THREE SPEED TRANSMISSION GEARING.
APPLICATION FILED MAY 16, 1906.
918,657.
Patented Apr. 20, 1909.
3 SHEETS—SHEET 3.
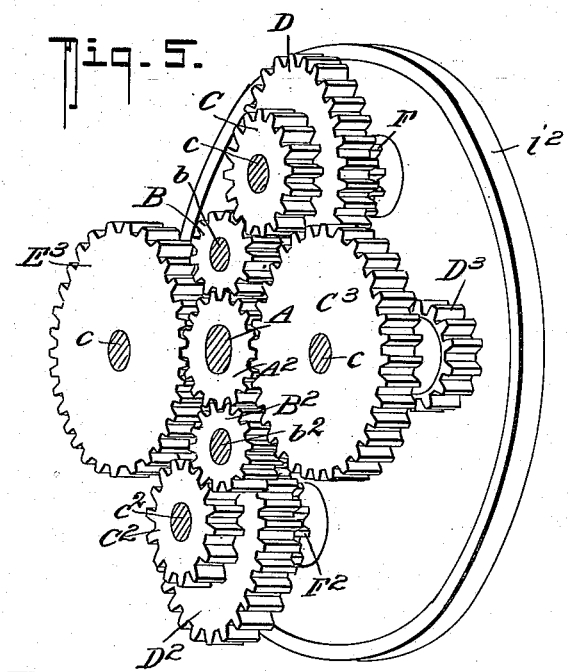
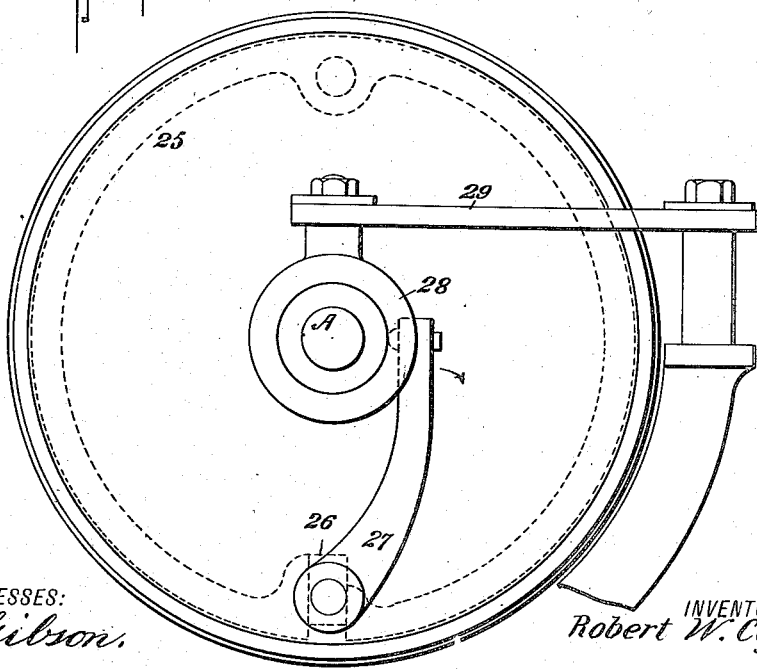
WITNESSES:
INVENTOR
Robert W. Coffee.
BY
ATTORNEYS

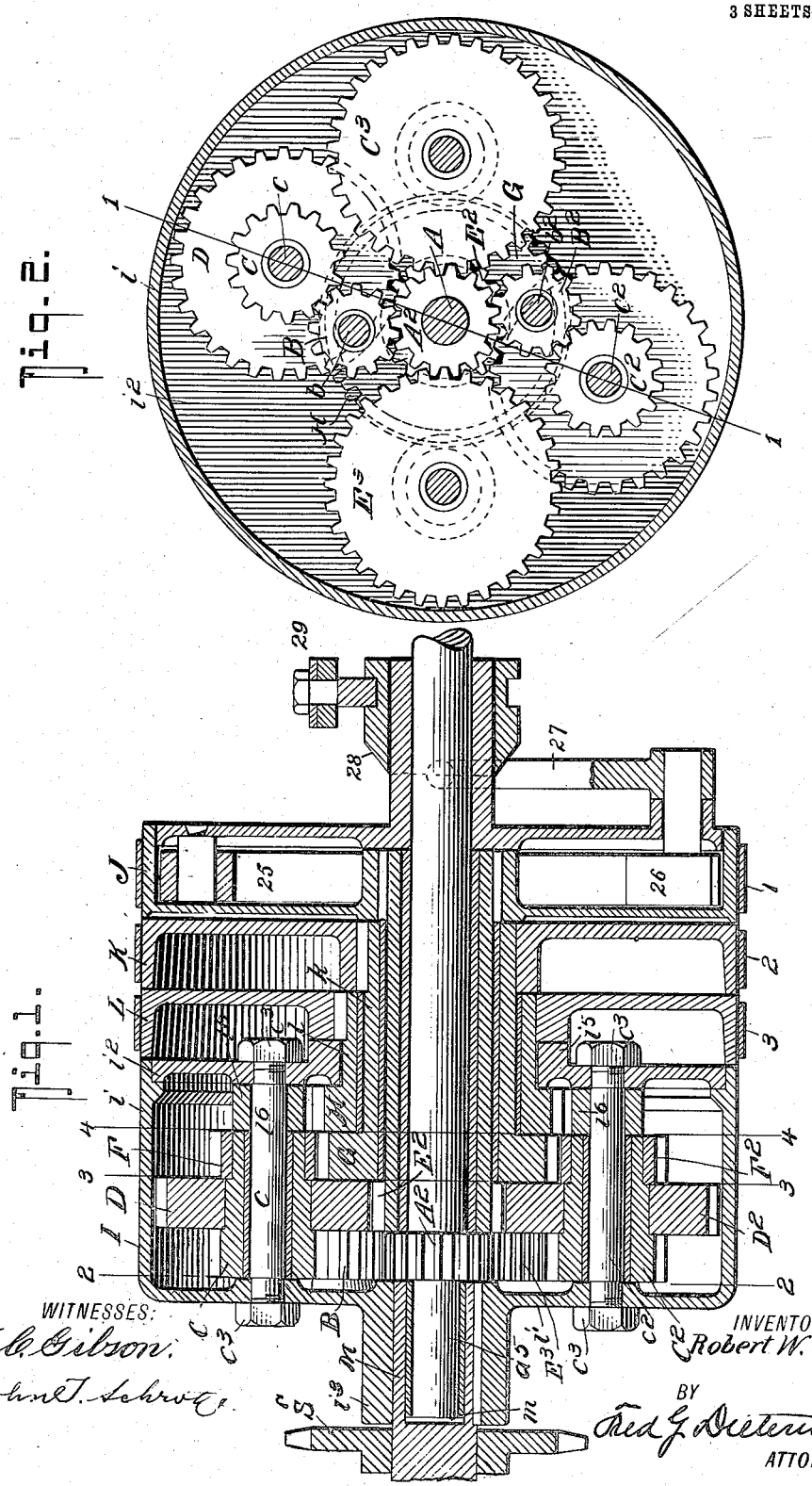

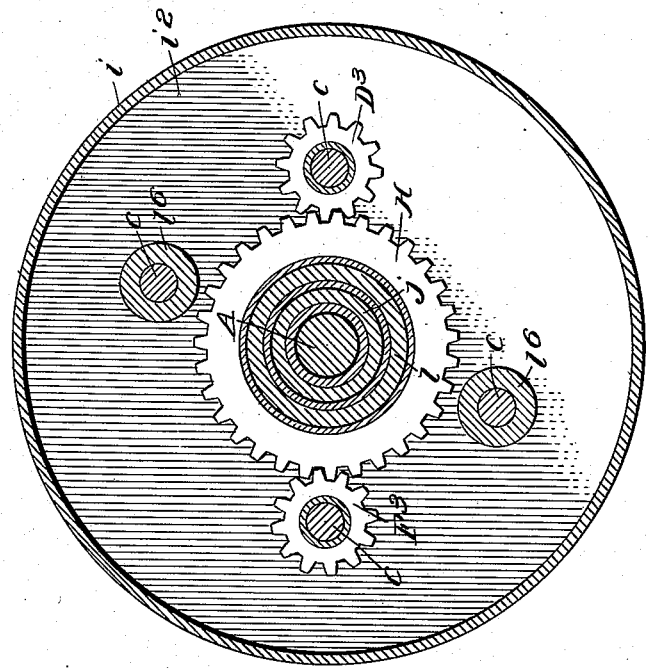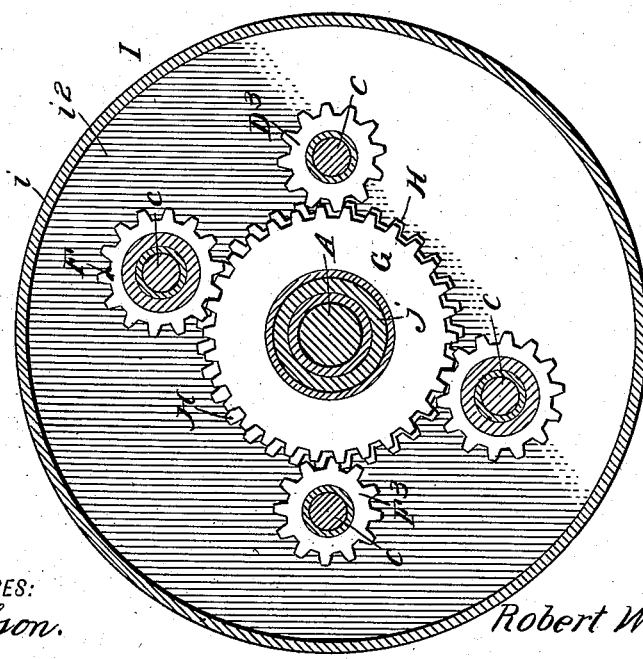

UNITED STATES PATENT OFFICE.

ROBERT W. COFFEE, OF RICHMOND, VIRGINIA, ASSIGNOR TO LEWIS M. KEIZER, OF BALTIMORE, MARYLAND.

THREE-SPEED TRANSMISSION-GEARING.

No. 918,657.  Specification of Letters Patent.  Patented April 20, 1909.

Application filed May 16, 1906. Serial No. 317,171.

*To all whom it may concern:*

Be it known that I, ROBERT W. COFFEE, residing at Richmond, in the county of Henrico and State of Virginia, have invented certain new and useful Improvements in Three-Speed Transmission-Gearing, of which the following is a specification.

My invention seeks to provide an improved variable speed gearing, of the planetary type, of a simple, compact and durable construction by which results in the desired ratios are positively and effectively obtained without the transverse strains such as is common in the usual forms of gearing of the kind referred to, and provision is made for a simple and effective connection of the gearing with the sprockets or other means of transmitting power to the driving axles of vehicles and for relieving the side thrusts of the gears.

With the above and other objects in view which will be hereinafter explained, my invention comprehends the general and specific arrangement of mechanisms hereinafter fully described, pointed out in the appended claims and illustrated in the accompanying drawings, in which:—

Figure 1, is a vertical section of my improved gearing taken substantially on the line 1—1 of Fig. 2, looking in the direction of the arrow $a$. Fig. 2, is a transverse section thereof taken on the line 2—2 of Fig. 1, looking in the direction of the arrow $b$. Figs. 3 and 4, are similar views taken respectively on the line 3—3 and 4—4 of Fig. 1. Fig. 5, is a perspective view of the casing I with the gears carried thereon, the inner or removable head portion of the casing being omitted. Fig. 6, is a diagram which illustrates the general arrangement of the clutch mechanism for locking all the gears within the casing I when my gearing is adjusted for the high or direct speed.

In its details of construction, my improved gear mechanism comprises a casing, I, formed of the annular rim $i$, the integral outer head $i'$, and a removable inner head $i^2$ which will be hereinafter again referred to, within which casing is contained the entire set of transmission gears. The solid end of the casing I has an axial hub $i^3$ which is provided with a shaft projection M to which the conveyer or chain sprocket S is fixedly connected, and which projection at its inner end has an axial socket $m$ in which journals one end $a^5$ of the main shaft A, the other end of which is projected beyond the casing, mounted in a suitable bearing, and in practice communicates with any source of motive power.

Adjacent the casing head the shaft A has a fixedly connected driving pinion $A^2$ which meshes with the diametrically and oppositely disposed intermediate pinions B and $B^2$ which are journaled on short stub axles $b$—$b^2$ projected inwardly from the casing head and these pinions B and $B^2$ mesh with the pinions C and $C^2$ which are journaled respectively upon the cross bolts $c$ and $c^2$ that are mounted in the opposite heads of the casing I and are made fast by the nuts $c^3$, as clearly shown in Fig. 1, by reference to which it will also be noticed the pinions C and $C^2$ form a part of a set of orbit gears which include the large gear D which is of much larger diameter than the gear C and the gear F of the same diameter as the said gear C, and the similarly arranged gears $D^2$ and $F^2$ which with gear $C^2$ form one set, and the gears C, D and F form the opposite set of orbital gears, it being understood that each of said sets of gears rotate as one gear.

$C^3$, $D^3$—$E^3$, $F^3$— represent two diametrically oppositely disposed sets of orbital gears, of which members $C^3$ and $E^3$ mesh with the drive pinion $A^2$ and the said sets of gears $C^3$—$D^3$ and $E^3$, $F^3$ are mounted in an axial plane at about 90° to the other two sets of orbital gears before referred to, which latter operate to provide for the intermediate and slow forward speed, while the gears $C^3$—$D^3$ and $E^3$—$F^3$ operate to effect the reverse speed as will be hereinafter explained.

The gears $C^3$—$D^3$ and $E^3$—$F^3$ are coöperatively held in mesh with the pinion $A^2$, and the sun gear H formed on the tubular hub member 1 that forms a part of the band drum L and which has bearing in an axial hub $i^5$, formed on the inner or removable casing head, see Fig. 1, which figure also clearly shows a second sun gear G that meshes with the orbit gears F and F' and which is fixedly formed on a long tubular axial bearing K rotatable in the long hub 1 and which forms an integral part of the band drum K, of the same diameter as drum L and mounted adjacent a third band drum also provided with a long hub $j$ that turns in the hub $k$ and is loosely mounted on the shaft and carries at its inner end a pinion $E^2$ fixedly connected to the said hub $j$, which meshes with the large orbit gears D and D², as clearly shown in Fig. 1.

I⁶—I⁶ are tubular spacing members mounted on the cross bolts that carry the orbit gears C—D and F and C², D² and F².

1, 2 and 3 designate brake bands that respectively engage with brake or band drums J, K and L, and which in practice, are controlled by suitable lever mechanism, for example, such as is disclosed in my co-pending application filed June 25, 1906, Serial No. 323,250, it being understood that the tightening of the bands 1, 2 and 3 on their respective drums serves to hold the drums and the gear members fixedly formed or attached thereon from rotation.

From the foregoing description read in connection with the drawings, the complete coöperative arrangement of my three speed gear mechanism will be readily understood. By reason of the manner in which the casing and the sectional drive shaft is coöperatively combined, and the peculiar intermeshing of the several independent sets of orbit gears and the two sun gears G and H, it follows that if the band 1 on the drum is tightened, (by any suitable means) the band drum J together with the gear E² therein become stationary and the two sets of orbital gears C, D and E, and C², D² and F² will revolve around the sun gear H in the same direction as the driving shaft A carrying with it the gear casing I and the shaft portion M keyed therewith at a ratio slower (one and four-eighths in the arrangement shown) than the driving shaft member A thereby obtaining the slow intermediate speed. When it is desired to provide for the slow forward speed the brake band 2 on drum K is tightened to hold the said drum and its sun gear G, when the orbital gears, C, D and F and C², D² and F² revolve around the said gear G, and thus effect the low ratio forward speed.

To effect a high forward speed it is only necessary to throw the clutch mechanism (which may be of any type now in common use) into operative engagement to lock all the gears within the casing, which will cause the rotation of the entire gearing including the casing I and its shaft portion M to revolve with the shaft A at the same speed.

The reversing of my gears is accomplished by holding the band drum L and pinion H with its corresponding brake band and the orbital gears C³, D³ and F³ will revolve in the opposite direction and thereby effect the movement of the casing I and its shaft section M reverse to that of the shaft A².

The clutch mechanism before referred to may be in the nature of a split band ring 25 mounted within the annular flange of the drum J, see Figs. 1 and 6, and arranged to be expanded at the desired times by the crank cam 26 located between the ends of the ring 25 and mounted in the short spindle of a rocker arm 27 that coacts with a sliding cone clutch 28 on the shaft A, shiftable through the medium of a lever 29, so arranged that the shoving of the cone clutch inwardly will rock the arm 27 in the direction indicated by the arrow on Fig. 6 and in consequence spread the clutch band to grip the flange of drum J and thereby hold said drum from rotation.

Having thus described my invention what I claim and desire to secure by Letters Patent, is:—

1. In a variable speed gearing, a drive shaft, a driving pinion fast thereon, a pair of sun gears mounted co-axially with the shaft, means for holding either of said sun gears stationary, a gear casing, a supplemental shaft mounted therein and axially projected therefrom in line with the driving shaft, orbital gears mounted in the casing to engage the sun gears, and means for sustaining the said orbital gears within the casing.

2. In a variable speed gearing, the combination with a drive shaft a fixedly attached pinion thereon, sun gears mounted co-axially with the shaft, a casing revolubly mounted on one end of the shaft, a power transmission axial extension fixedly mounted on the casing in alinement with the drive shaft, a series of orbital gears mounted on the casing and meshing with the pinion on the drive shaft and with said sun gears, and means for holding said sun gears stationary to effect a revolution of the orbital gears with the drive shaft, but at a different speed.

3. In a three speed transmission gear mechanism, in combination with the drive shaft and a supplemental shaft held for independent movement, and a pinion fixed to the drive shaft; of a sun gear loosely mounted on the drive shaft, a band drum to which the said gear is connected, an orbital gear for engaging said sun gear, a casing fixedly connected to and revoluble with the supplemental shaft for supporting said orbital gear, and a mechanism for braking the drum.

4. In a three speed transmission gearing, a main drive shaft, a pinion fixedly mounted thereon, a single gear casing revolubly mounted over one end of said main drive shaft, a driven shaft carried by the casing and projecting co-axially with the drive shaft, and orbital gears mounted in said casing that engage the pinion on the drive shaft and that engage the sun gears, and a brake mechanism coöperating therewith.

5. In a transmission gear mechanism of the character described, a main drive shaft, a drive pinion fixedly mounted thereon, a casing mounted over one end of the drive shaft, a driven shaft secured to turn with the casing and having an axial bearing for the drive shaft, sun gears, and a train of orbital gears carried by the casing that mesh with the main shaft pinion and with the sun gears for transmitting motion to the casing and to the driven shaft in the same direction as the drive shaft but at a different speed.

6. In a transmission gear mechanism of the character described, a main drive shaft and a drive pinion carried thereby a one-part casing, a driven shaft secured to turn therewith, and held co-axially with the drive shaft, sun gears coaxial with the drive shaft pinion, band drums for controlling the sun gears, orbital gears mounted on the casing to mesh with the sun gears and with the shaft pinion, and means coöperating with the drums for holding the sun gears stationary for the purposes specified.

7. A three speed transmission gear mechanism comprising a drive shaft, a pinion carried thereby, a casing revolubly mounted over one end of the drive shaft, a driven shaft secured to the casing co-axially with the drive shaft, a drum and a sleeve mounted on the shaft and provided with a sun gear, a second drum and a sleeve mounted on the first sleeve, a sun gear attached to said second drum sleeve, a third drum and sleeve mounted on the second drum sleeve, a sun gear attached to said third drum sleeve, a set of orbital gears mounted on the casing engaging the shaft pinion and the first and second sun gears, another set of orbital gears mounted on the casing to engage the first and third sun gears and a brake band for each drum.

8. A three speed transmission gear mechanism which comprises a drive shaft, a casing mounted over one end thereof, a driven shaft connected to turn with the casing and held co-axially with the drive shaft, said driven shaft having a bearing for the end of the drive shaft, a pinion fixedly held on the drive shaft, three sleeves telescopically mounted over said shaft, a sun gear on each of said sleeves, a drum coöperating with each sleeve, a set of orbital gears that mesh with the shaft pinion and with the first and second sun gears, another set of orbital gears that mesh with the first and third sun gears, said orbital gears being mounted on the casing, brake bands for each drum, and a clutch mechanism for locking the orbital gears, the casing and the drive shaft together to cause the driven shaft to turn with and at the same speed as the drive shaft.

9. Transmission gearing comprising a drive shaft, a sprocket or driven shaft, a one-part gear casing connected with said driven shaft, a pinion on said drive shaft, a sleeve loosely mounted directly on the drive shaft, a sun gear mounted on the sleeve in a position within the casing, a brake drum connected with the sleeve in a position outside of the casing, orbital gears within the casing engaging the casing and said sun gear and driven by said drive shaft pinion, and a brake for said drum.

10. Transmission gearing comprising a drive shaft, a driven shaft, a one-part gear casing connected with the driven shaft, a pinion on the drive shaft, a sleeve loosely mounted directly on the drive shaft, a sun gear carried by said sleeve within the casing, a brake drum carried by said sleeve outside of the casing, a second sleeve loosely mounted on the first sleeve, a sun gear within the casing mounted on the second sleeve, and a brake drum mounted on the second sleeve outside of the casing, a set of orbital gears within the casing for each sun gear, said orbital gears engaging the casing and the sun gears and driven by the shaft pinion and brakes for said brake drums.

11. Transmission gearing comprising a drive shaft, a driven shaft, a one-part gear casing connected with said driven shaft, a pinion on said drive shaft, a sleeve loosely mounted directly on said drive shaft, a sun gear within the casing and mounted on said sleeve, a brake drum outside of the casing mounted on said sleeve, a second sleeve loosely mounted on said first sleeve, a sun gear within the casing mounted on said second sleeve, a brake drum outside of the casing mounted on said second sleeve, a third sleeve mounted on the second sleeve, a sun gear within the casing mounted on said third sleeve, a brake drum outside of the casing mounted on said third sleeve, orbital gears within the casing for said sun gears, and driven by the shaft pinion, and brakes for said brake drums.

12. Transmission gearing, comprising a drive shaft, a sprocket or driven shaft end to end therewith, said shafts forming at their opposing end a bearing one for the other, and fixedly positioned gearing from one shaft to the other, whereby the two shafts have different drives.

13. Transmission gearing, comprising a drive shaft, a sprocket or driven shaft end to end therewith, said shafts forming at their opposing ends a bearing one for the other, a casing carried by said driven shaft, a drive pinion on said drive shaft, and differential gearing from said pinion to said casing.

14. Transmission gearing, comprising a drive shaft, a sprocket or driven shaft in alinement therewith, the end of said drive shaft having a bearing in said driven shaft, a gear casing mounted on said driven shaft and extending over said drive shaft, a drive pinion and a sun gear on said drive shaft, orbital gears engaging said casing and sun gear, and driven by said drive pinion, and means for holding said sun gear stationary.

15. Transmission gearing, comprising a drive shaft, a sprocket or driven shaft in alinement therewith, a gear casing carried by said driven shaft and extending over said drive shaft, a drive pinion and a sun gear on said drive shaft, orbital gears engaging said casing and sun gear, and driven by said drive pinion, and means for holding said sun gear stationary.

16. Transmission gearing, comprising a drive shaft, a driven shaft, a gear element carried by the driven shaft, and a gear element fixed to the drive shaft, a plurality of sets of planetary gears each engaging on the one hand one of said gear elements, and on the other hand the other of said gear elements, and means for setting said gearing to operate the driven shaft through either set of planetary gears.

17. Transmission gearing, comprising a drive shaft, a driven shaft, a gear casing carried by the driven shaft, a pinion fixed on the drive shaft, a sun gear loosely mounted on the drive shaft, orbital gears engaging the sun gear and in driving connection with the casing and the fixed pinion, means for holding said sun gear stationary, and means for locking said sun gear to the shaft.

18. Transmission gearing comprising a drive shaft, a driven shaft, a one-part gear casing carried by the driven shaft, a pinion fastened to the drive shaft within the casing, a sleeve loosely mounted on the drive shaft, a sun gear within the casing mounted on said sleeve, a brake drum mounted on said sleeve outside of the casing, orbital gears within the casing in driving connection therewith and with the aforesaid pinion and sun gear, a brake for holding said drum stationary, and a clutch for rigidly connecting said drum with the drive shaft.

ROBERT W. COFFEE.

Witnesses:
FRED G. DIETERICH,
J. ALEX. HILLEARY, Jr.